(No Model.)

M. H. C. W. FARJASSE.
CLUTCH.

No. 510,532. Patented Dec. 12, 1893.

WITNESSES:
Fred White
Thomas H Wallace

INVENTOR:
Maurice Hippolyte Charles Washington Farjasse,
By his Attorneys,

THE NATIONAL LITHOGRAPHING COMPANY,
WASHINGTON, D. C.

UNITED STATES PATENT OFFICE.

MAURICE HIPPOLYTE CHARLES WASHINGTON FARJASSE, OF NEUILLY-SUR-SEINE, FRANCE.

CLUTCH.

SPECIFICATION forming part of Letters Patent No. 510,532, dated December 12, 1893.

Application filed March 19, 1892. Serial No. 425,625. (No model.) Patented in France March 14, 1890, No. 204,482; in England July 3, 1890, No. 10,318; in Belgium July 3, 1890, No. 91,129; in Switzerland September 25, 1890, No. 2,869; in Italy February 26, 1891, XXV, 29,263, LVII, 268, and in Austria-Hungary August 13, 1891, No. 9,791 and No. 28,348.

*To all whom it may concern:*

Be it known that I, MAURICE HIPPOLYTE CHARLES WASHINGTON FARJASSE, a French citizen, residing at Neuilly-sur-Seine, (Seine,) France, have invented certain new and useful Improvements in Clutches, of which the following is a specification.

This invention has been patented in France, by Patent No. 204,482, dated March 14, 1890; in England, No. 10,318, dated July 3, 1890; in Belgium, No. 91,129, dated July 3, 1890; in Switzerland, No. 2,869, dated September 25, 1890; in Austria-Hungary, Vienna, No. 9,791, and Buda-Pesth, No. 28,348, dated August 13, 1891, and in Italy, No. XXV, 29,263, and No. LVII, 268, dated February 26, 1891.

My invention relates to clutches, and particularly to friction clutches of the class wherein a helix is used to lock together driving and driven parts.

The invention aims to provide an improved clutch of the said class which will be simple of construction, effective in operation, and facile of manipulation, and one in which the clutching force can be easily controlled and adjusted to either a light friction or an absolute locking together between the parts.

As is well known, all clutch apparatus consists of two separate parts, either of which may be connected to a shaft, pulley, gear wheel or equivalent device, the one being the driven part and the other the driving part, which parts are coupled together or uncoupled accordingly as the driven part is to be set in motion or to be freed.

According to my invention I provide certain improvements in the structural details and arrangement of a clutch or coupling in which a strap, which may be a cord, a wire, a metal band, or any suitable equivalent is attached at one end to the driving part and coiled around the driven part, and having its other end attached to a loose ring on the latter.

Hereinafter I will term the end of the strap which is fixed to the driving part the "driving end," and the other end the "clutch end," while the loose ring will be termed the "clutch ring."

I will proceed to describe my invention, referring to the accompanying drawings in which—

Figure 1:
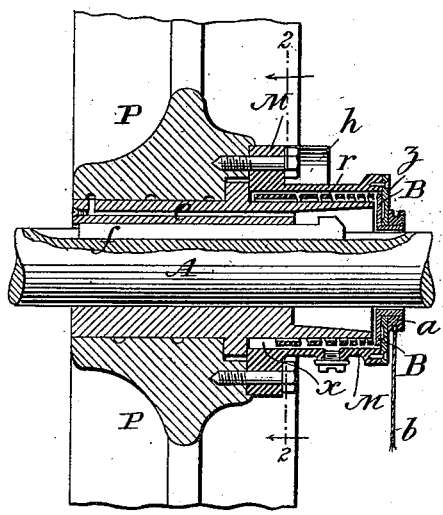
Figure 2:
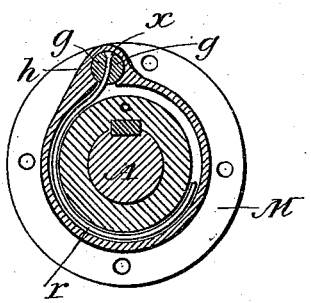
Figures 3, 4:
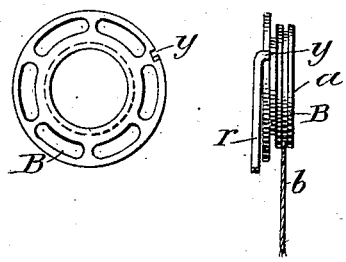
Figure 5:
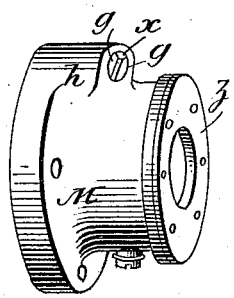

Figure 1 is a fragmentary elevation of a shaft on which is shown in axial section the hub of a driving pulley and my improved clutch. Fig. 2 is a cross section thereof on the line 2—2 of Fig. 1. Fig. 3 is a detached view of the loose ring shown in Fig. 1. Fig. 4 is an edge view of this ring showing the attachment of the clutch end of the strap thereto. Fig. 5 is a perspective view of the inclosing sleeve shown in Fig. 1.

Let A represent the driven shaft, P the driving pulley, $r$ the strap, and B the clutch ring. To the pulley P is fixed the driving end $x$ of the strap, which in this instance is a band $r$ which is coiled around a bushing $e$ keyed to the shaft A and is secured at its driven or clutch end to the clutch ring B which latter loosely embraces the shaft. The ring B is shown detached in Figs. 3 and 4, the latter showing the driven end $y$ secured to the ring by riveting. It may be secured thereto in any other suitable manner if desired. The driving end $x$ of the strap, instead of being fixed directly to the pulley P itself, is preferably secured between two semi-circular pins $g$ $g$, which are mounted in a hole in the projecting flange $h$ of a sleeve M, as seen in Fig. 2, and more clearly in Fig. 5. The end of the strap is preferably dovetailed as shown in Fig. 2 to prevent its escape between the pins $g$. The sleeve M is preferably a hollow inclosing sleeve bolted to the hub of the pulley P and surrounding exteriorly the strap $r$ and has an annular cover $z$ at its outer end preferably inclosing the driven end $y$ and a portion of the clutch ring B.

Any suitable means for impeding the rotation of the ring B may be employed. I prefer to construct it with a peripheral groove $a$ as seen in Figs. 1 and 4 and to pass around this a small cord $b$, as seen in Fig. 1, so that by applying a slight tension to the cord its friction in the groove will produce the required resistance to the rotation of the ring B. The extent of impeding tension of the cord determines the strain upon the strap $r$ and consequently the clutching force. On releasing the cord the ring B will be free, and immediately the strap r will uncoil slightly, owing to its stiffness and will thus at once release the driven part.

It will be seen that the described clutch will act only up to a certain strain, as should the resistance offered by the driven part be greater than the frictional grip of the strap r, the latter would slip around.

The throwing in gear of my improved clutch being very gradual it is particularly suitable for use in machines in which sudden strains occur, such as cutting and punching machines. In such use it avoids rupture or straining of the working parts. It is also applicable with advantage to heavy machinery such as rolling and crushing mills, in which, if sudden strains, stopping the motion more or less, occur, the clutch apparatus will give way and prevent damage.

As stated, the grip of the strap r, being proportional to the force applied to the cord b the transmission of any degree of energy or speed from a motor developing a greater energy or speed can be obtained by varying the tension on the cord b, so that various machines working at different speeds can be driven direct from one shaft by means of my clutches, and machines such as sewing machines can be worked at will by treadles or by power by simply throwing my clutch apparatus into or out of gear by exerting or releasing tension on the cord b thereof by a treadle or otherwise.

My improved clutch possesses the following advantages:—First, a slight force serves to throw it into and preserve it in action, and upon removing this force it immediately ceases to act; second, the clutching action is a gradual increasing one, and the release instantaneous; third, the driven part has no direct connection with the driving part when put in gear; its action is automatic; fourth, shocks in throwing the clutch into and out of gear are avoided.

This clutch may be used under various conditions and for numerous purposes, such as for a safety clutch, for detaching the shafting from a motor when required or for connecting or disconnecting two lengths of shafting. It can be advantageously applied to winches, cranes, and the like. For winches I dispose on the driving axle two clutches; the first connecting the gearing wheel with the axle for raising the load and the second connecting this axle with the clutch ring on which a strain is produced to constitute a brake when the shaft is turned in the contrary direction.

What I claim is, in clutches, the following-defined novel features and combinations, substantially as hereinbefore set forth, namely:

1. In a friction clutch, the driving pulley P and the driven shaft A, the bushing e fixed to said shaft, and a helical band r fixed at one end of said pulley and coiled around said bushing, in combination with a sleeve M inclosing said band, a ring B fixed to the other end of said band, a grooved pulley a fixed to said ring, and a disk-plate z fixed to the outer end of said sleeve M, surrounding said ring B, and depending between the latter and said pulley a and closing the end of said sleeve, substantially as and for the purpose set forth.

2. In a friction clutch, the driving pulley P, the driven shaft A, the bushing e, fixed to said shaft, and the helical band r coiled around said bushing, in combination with a sleeve M inclosing said band, fixed to said pulley, and having bored out portion h, said band having enlarged end x entering the bore of said portion h of said sleeve, and pins g g fitting the outer sides of said end x of said band, seated in the bored portion h of said sleeve, and locking the end of said band to said sleeve, substantially as and for the purpose set forth.

In witness whereof I have hereunto signed my name in the presence of two subscribing witnesses.

MAURICE HIPPOLYTE CHARLES
WASHINGTON FARJASSE.

Witnesses:
ROBT. M. HOOPER,
AUGUSTE MATHIER.